318-135

CROSS REFERENCE SEARCH ROOM

April 21, 1964 G. A. JALLEN ET AL 3,130,331

LINEAR MOTORS

Filed June 26, 1961 4 Sheets-Sheet 1

INVENTORS
GALE A. JALLEN
ROBERT R. REISINGER
DONALD K. SAMPSON
BY Carlsen & Carlsen
ATTORNEYS

LINEAR MOTORS

Filed June 26, 1961

4 Sheets-Sheet 2

INVENTORS
GALE A. JALLEN
ROBERT R. REISINGER
DONALD K. SAMPSON

BY Carlsen & Carlsen
ATTORNEYS

INVENTORS
GALE A. JALLEN
ROBERT R. REISINGER
DONALD K. SAMPSON
BY
Carlson & Carlson
ATTORNEYS

LINEAR MOTORS

Filed June 26, 1961 4 Sheets-Sheet 4

INVENTORS
GALE A. JALLEN
ROBERT R. REISINGER
DONALD K. SAMPSON
BY Carlson & Carlson
ATTORNEYS

United States Patent Office

3,130,331

Patented Apr. 21, 1964

3,130,331
LINEAR MOTORS

Gale A. Jallen, St. Paul, Robert R. Reisinger, Mahtomedi, and Donald K. Sampson, St. Paul, Minn., assignors, by mesne assignments, to Data Products Corporation, Culver City, Calif., a corporation of Delaware

Filed June 26, 1961, Ser. No. 119,453
9 Claims. (Cl. 310—14)

This invention relates generally to electric actuators and is more particularly directed to electric actuators for providing a linear motion output and which may be positioned accurately at a predetermined number of positions.

Numerous applications exist in present day automatic control systems in which linear motion of an actuator or operator is necessary to provide a desired function. Further, a requirement exists in many of these applications for a device which provides highly accurate positioning and the ability to repeatedly move from one to another position in response to command signals. Prior art devices for accomplishing this manner of operation of a linear actuator have included the solenoid in which a long coil winding may be provided with a plurality of taps to variably energize only portions of the winding to cause the actuator member to center itself in the middle of an energized portion of the winding. These devices have been satisfactory for low power applications wherein accuracy has not been a stringent requirement. Another device which provides a highly accurate system of positioning a linear operator is the servo system in which an electric motor having a rotational output is utilized to drive, through mechanical gearing, an actuator and a follow-up system is utilized to insure positional accuracy. While the expense of providing such a system may be tolerated in a number of areas, a need has existed for a device having the necessary and desirable properties of operation and which may be produced for a realistic cost.

The present invention is directed to improvements in an accurate linear actuator which, for example, is particularly desirable for use in a magnetic memory file in which a plurality of read-write heads must be repeatedly positioned over tracks which are generated on a magnetic recording disc at high densities.

It is therefore an object of the present invention to provide an improved linear actuator.

Another object of the invention is to provide a linear actuator of new and novel construction.

Another object of this invention is to provide a linear actuator which attains improved operational characteristics.

It is another object of this invention to provide a linear actuator which may be energized to provide improved accuracy of positioning of a movable member.

Another object of this invention is to provide an improved apparatus for applying the output of the actuator to further apparatus or devices.

It is a further object of this invention to provide a linear actuator in which the motion of a movable member upon energization is controlled so as to prevent overshoot.

It is a further object of this invention to provide a new and improved electric actuator which is operable at a high efficiency.

It is a further object of this invention to provide an improved linear actuator which provides an increased number of predetermined operating positions.

These and other more detailed and specific objects will be disclosed in the course of the following specification, reference being had to the accompanying drawings, in which—

Briefly the invention includes a pair of coil winding assemblies each having a core and a plurality of pole pieces and coil windings alternately positioned along the length axially thereof. The assemblies so described are superimposed and rigidly mounted in the such position to provide for the movement of the movable output member therebetween along guide means also rigidly mounted with respect to the coil assemblies. A movable output member is mounted on the guide means for reciprocatory movement axially back and forth along the volumes between the superimposed coil assemblies.

Figure 1:
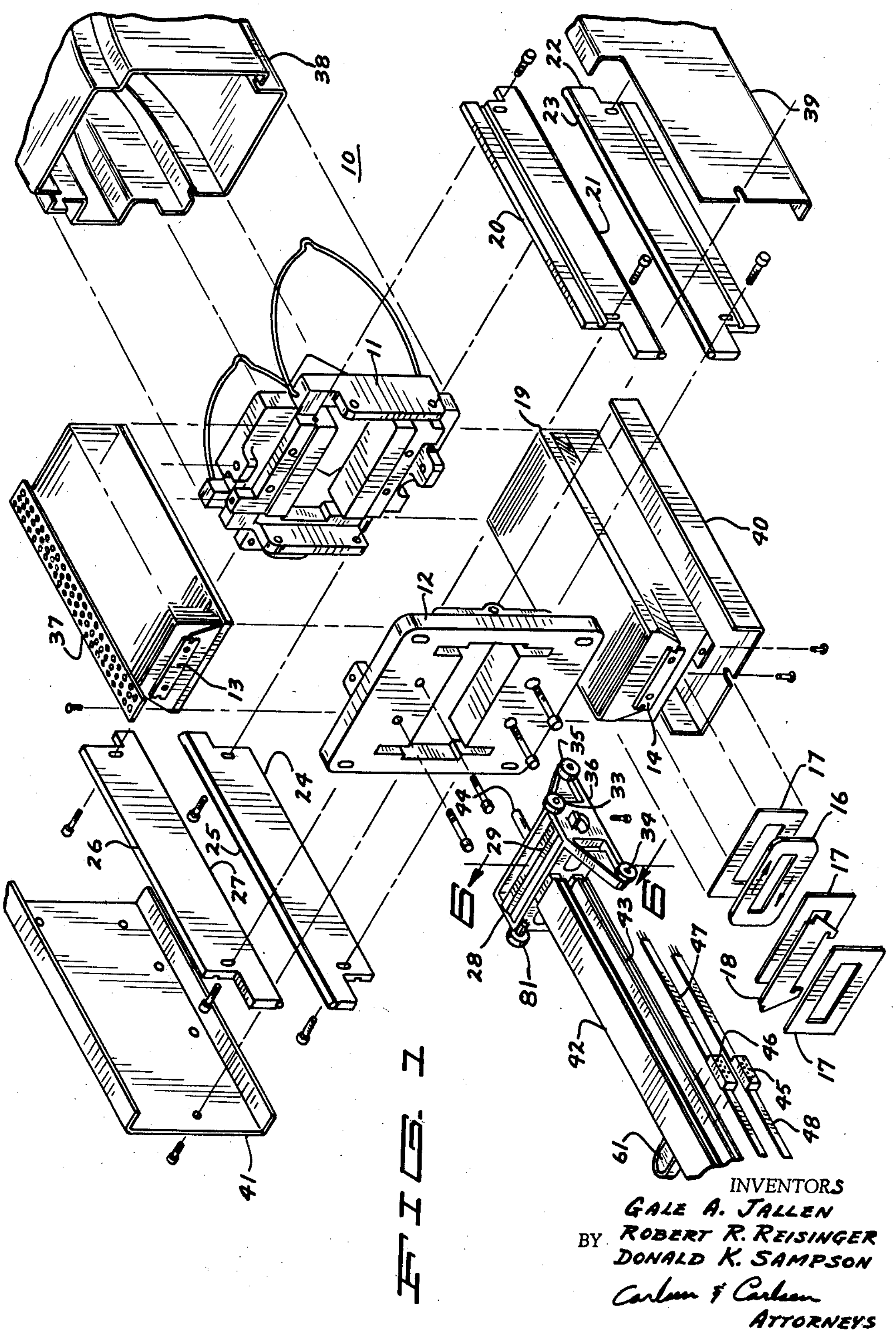
FIG. 1 is an exploded assembly view of a device constructed according to the principles of my invention.

Referring specifically now to FIG. 1, a pair of frame members 11 and 12 are adapted to have mounted thereon, a plurality of guide members 20, 22, 24 and 26 each including guide means 21, 23, 25 and 27 respectively for coaction with rotatable members on a movable member to be described below. These guide means are mounted upon the frame members by suitable fastening means and may be adjusted vertically relative to one another.

An upper coil winding assembly, including a core member 13 and a plurality of terminals 37, is suitably attached to the top ends and between the frame members 11 and 12. In like manner, a lower coil assembly including a core member 14 and a plurality of ladder like elements 19 is mounted between the lower ends of frame members 11 and 12 by suitable fastening means and held in position so as to form a unitary assembly, which may be identified as a field winding assembly. As illustrated on the lower coil winding assembly, the coil winding assemblies are comprised of a plurality of elements positioned axially longitudinally of the core members 13 and 14 and these may be identified as insulating spacer 17, coil winding 16, insulating spacer 17 and pole piece 18. This pattern is repetitive along the axial length of the core members 13 and 14.

Figures 2, 3, 6:
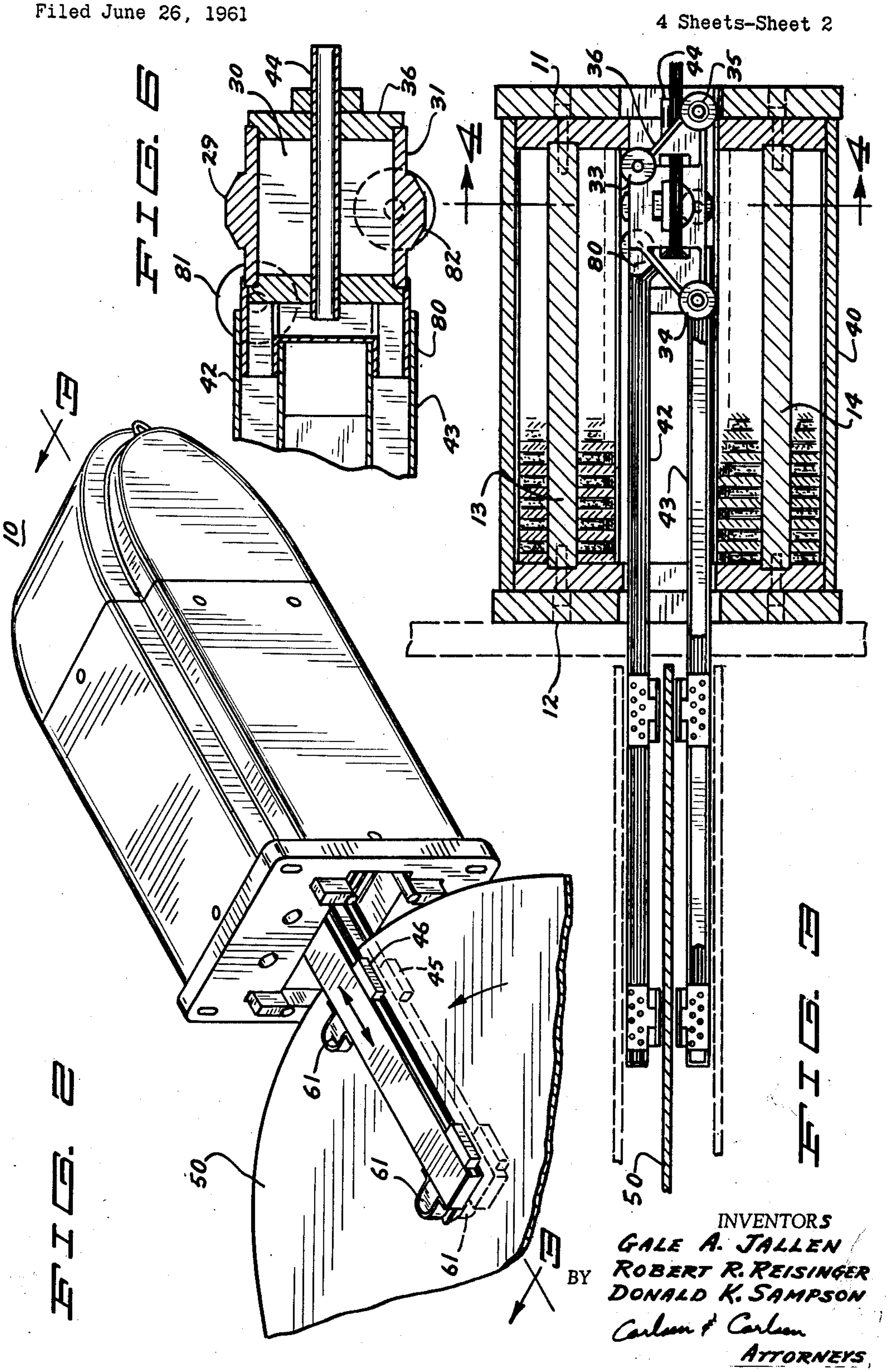
FIG. 2 is a perspective drawing illustrating the use to which the embodiment of this application may be utilized.
FIG. 3 is a longitudinal sectional view of an assembled embodiment of this invention.
FIG. 6 is a cross sectional view taken along the center line 6—6 of FIG. 1.
Figure 4:
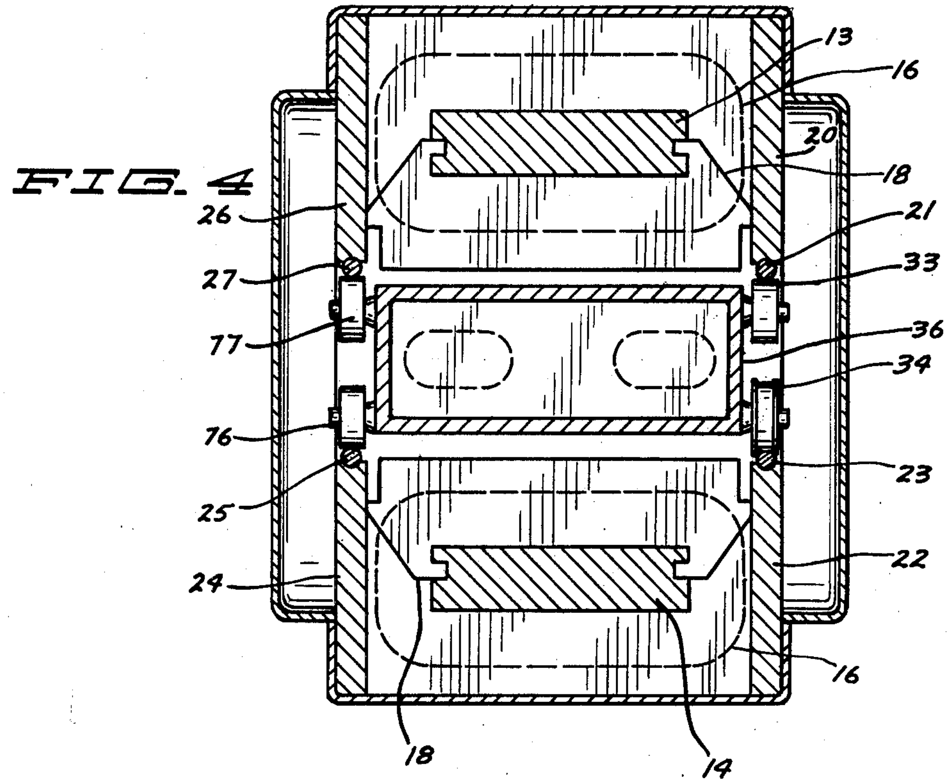
FIG. 4 is a sectional view taken along the section line 4—4 of FIG. 3.
Figure 8:
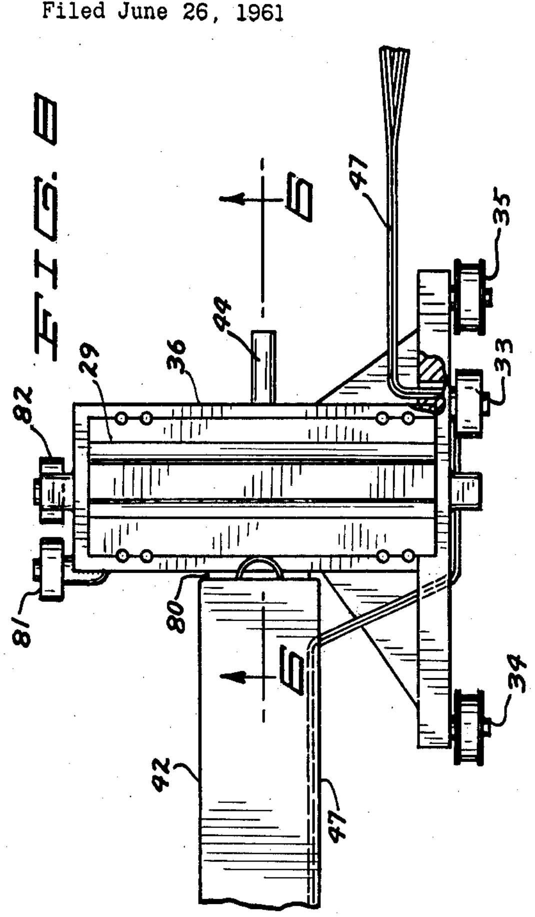
FIG. 8 is a top view of the portion of FIG. 6 surrounding the section line 6—6.

A movable output member 28 is mounted for reciprocatory movement along the axial length of the field winding assembly and is adapted to be positioned between the coil winding assemblies and there held by coaction of roller members 33, 34, 35 and 81 and 82 (as shown on FIGS. 6 and 8). It may be noted that each of the roller members is suitably journalled for rotation about a journal extending transversely to the axial direction of travel of the movable output member. The frame for the output member is indicated generally by the reference character 36. Each of the roller members 34 and 35 are suitably dimensioned so as to provide coaction with guide member 23 such that movement other than linear axial relationship with guide member 23 is prevented. Suitable flanges, a groove or a V-type construction may be utilized for this purpose. A pair of pole pieces 29 and 31 are positioned across the top and bottom of frame 36 and extend in a direction normal to the axial direction of travel of the movable output member. A source of magnetic flux, 30, is contained within the frame 36 and is positioned in energizing relationship with respect to pole piece member 29 and 31 as to provide, for instance, a north pole at member 29 and a south pole at member 31. The source of magnetic flux energy may be comprised of a single magnet, a plurality of magnets or, may be of the electro magnetic variety. A pair of upper and lower forwardly extending arms 42 and 43 extend from the forward end of frame 36 and are securely affixed, in fluid tight relationship, with a member 80 mounted on frame member 36. A conduit, 44, extends through the center of frame 36 into communication with mounting element 80 and thereon into the interiors of elements 42 and 43 so as to provide a source of fluid under pressure for use at the locations of the mounting means 61 for urging the transducers toward the revolving discs.

A plurality of electrical devices are mounted on mounting elements 61 and may be utilized to coact with, for instance, a revolving disc of magnetic recording material 50 for reading and writing, or bi-laterally transducing information onto and from the magnetic material. Those skilled in the art will recognize that the disc 50, of magnetic recording material, will contain a plurality of discrete tracks which require the positioning of the read and write transducers to accurate repeatable predetermined positions so as to provide for the maximum storage of information upon the surface of the magnetizable medium. A plurality of electric conductors, 47 and 48, are positioned along one edge of the forwardly extending elements 42 and 43 and are provided for connection to suitable terminal blocks 45 and 46 which in turn coact with the transducers upon the mounting means 61. As shown in FIG. 3, these conductors are adapted for connection to suitable sources of signal through the right hand end of the mounting member 36 (not shown). Members 38, 39, 40 and 41 are shown for suitably enclosing the apparatus after assembly so as to exclude foreign matter from interfering with a normal operation.

Figure 5:
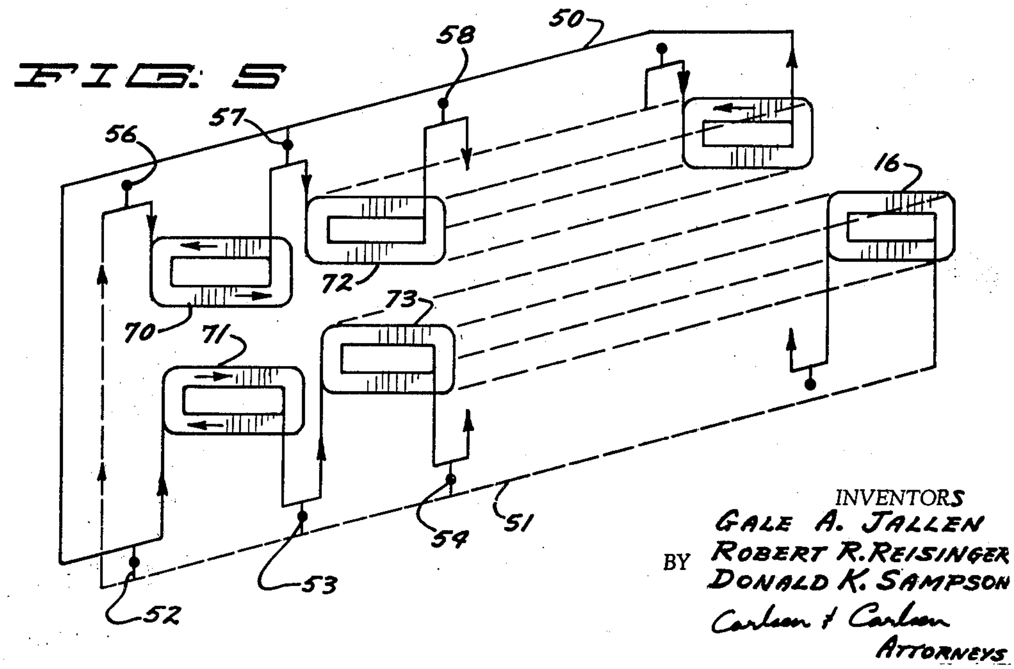
FIG. 5 is a perspective schematic diagram of the wiring assembly of the present embodiment of this invention.
Figure 7:
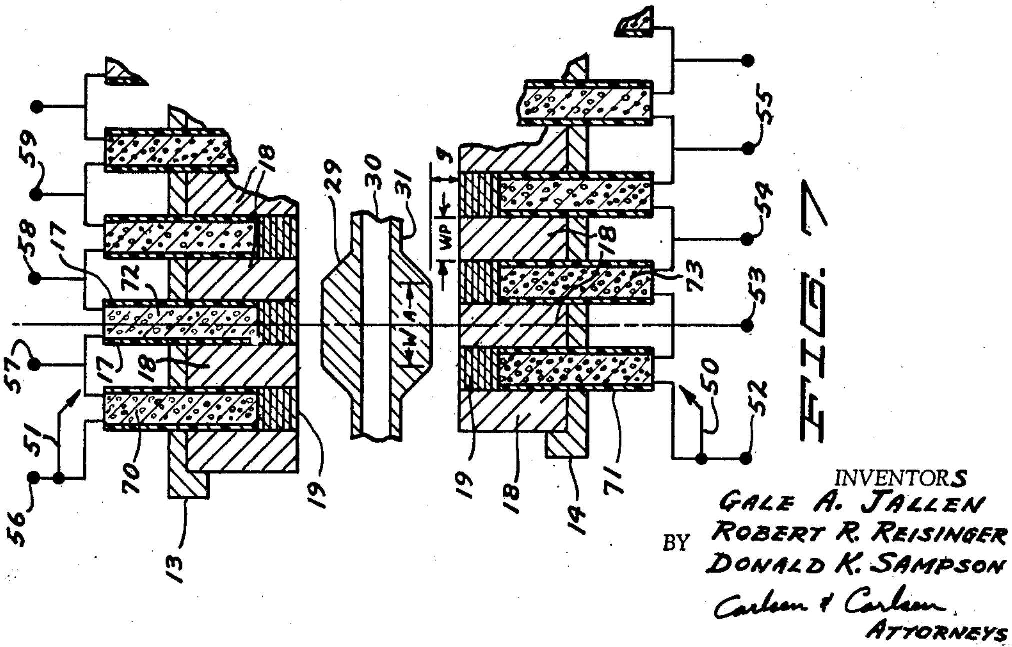
FIG. 7 is a pictorial representation of the construction of this invention for illustrating the dimensional aspects thereof.

Referring specifically to FIG. 5 and FIG. 7, it may be noted that the plurality of coils included in each of the field coil assemblies have associated therewith a plurality of terminals for connection to a suitable source of electrical energy (not shown). In FIG. 5, the windings in the upper field coil assembly are connected in series aiding relationship and, between each of the individual coil windings, for instance 70 and 72, there is provided a terminal for connection to a suitable source of electrical energy. Likewise, in the lower assembly a series connection is used and a terminal for connection to a suitable source of electrical energy between coil windings, for instance 71 and 73, is provided. The end of the top right hand winding is connected to the beginning of the bottom left hand winding by conductor 50 and the end of the bottom right hand winding is connected to the end of the top left hand winding by conductor 51. In this manner, terminals electrically positioned at complementary axial positions of the assemblies serve to define a point at which current applied to the particular pair of terminals, for instance terminals 53 and 57, divides along equal parallel paths and also creates opposing fluxes such that the flux on one side of the axial position of the terminals is in one direction and is in the other direction on the other side.

FIG. 7 illustrates a preferred embodiment of the construction and dimensions of this invention. Considering the upper field winding assembly, a core member 13 has positioned axially thereon a plurality of pole pieces 18, which are separated by a plurality of coil windings having insulating spacers positioned on both sides thereof. Coil windings 70 and 72 correspond to the coil windings shown in FIG. 5 and the terminals 56, 57 and 58 correspond to like terminals in FIG. 5. It is to be noted that the lower surface of the top coil assembly contains equal volumes of the magnetizable material of which the pole pieces 18 are constructed and alternately positioned volumes 19, of non-magnetizable material, for instance, copper.

As may be seen in FIG. 1, on the top of the bottom field winding assembly, the volumes 19 are made up of a plurality of layers of non-magnetizable material, which are ladder-like in appearance, that is a plurality of areas are stamped out and these laminations are pressed in place over the plurality of pole pieces 18, so as to completely surround each of the pole pieces with a volume of non-magnetizable material. This provides a suitable arrangement for providing electrical damping in the operation of our invention and, aids in the providing construction in which the axial lengths of the pole pieces and the non-magnetic material are equal. This factor contributes to the efficient and accurate operation of this invention. The top field winding assembly is similarly constructed.

It should be noted that the two superimposed field winding assemblies are mounted so that a pole piece is opposite a coil winding having the non-magnetic material positioned thereon to effect a staggered pole arrangement. When energized in suitable manner, this increases the number of predeterminable positions for the movable output member by a factor of two over constructions in which there is no staggering provided.

The length of a pole piece has been designated by the symbol $W_p$ and the axial length of the effective portion of pole pieces 29 and 31 on the movable output member has been designated by the reference character $W_a$. The air gap existing between either of the pole piece faces 29 and 31 and the field winding assemblies, has been identified by the reference character $g$. It is desirable that the air gap "$g$" between the top and bottom pole pieces 29 and 31 and the respective field winding assemblies be of the same dimension, or equally divided therebetween. By utilizing the formula $W_a = W_p + 2g$, it has been discovered that the highest efficiency of operation is attained.

In operation, suitable means, not shown, are provided for energization of our invention from a source of electrical energy so that appropriate terminals corresponding to the position desired may be connected to such source of energy and a motor action, obtained from the reaction between the flux provided by the source of magnetic flux in the movable output member and that generated in the field winding assemblies, will serve to position the movable output member 36 in accordance therewith. For example, to position the movable output member at the location shown in FIG. 7, a suitable source of energy is connected between terminal 53 and terminals 57 and 58. Assuming that terminals 57 and 58 have been connected, for instance, to a positive terminal on a source of direct current energy and terminal 53 is connected to the negative terminal of a source of direct current energy. The current at terminals 57 and 58 will divide equally among parallel paths, the first of which may be traced from terminal 57, through coil 70, conductor 50 to the right hand coil of the bottom field winding assembly, through each of the series connected coil windings on the lower coil winding assembly, coil 73 and thence to terminal 53. Likewise, the current will flow from terminal 58 through the coil positioned to the right of the coil 72, the series connected coil to the right hand end of the top filed winding assembly, through conductor 50, coil 71 and to terminal 53 to complete the circuit. It is to be noted that coil winding 72 is effectively out of the circuit so as to resolve any possible ambiguities resulting from the coaction of the flux generated in the movable output member and the flux generated in coil 72.

It is desirable that the current flow through each of the parallel paths be of substantially equal magnitude to cause positioning of the movable output member at the center line shown in FIG. 7. With this in mind, it may be seen that a plurality of such center lines exist between coil windings having the non-magnetizable material positioned thereon and oppositely positioned pole pieces and that connections to corresponding terminals may be made to re-position the movable output member to any one of the plurality of positions so defined and that the accuracy of positioning may be held to reasonably close tolerances. It has been observed that with a minimum of precision machining and assembling, positional accuracies to .001 of an inch are easily obtained.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Apparatus of the class above described, comprising; a pair of magnetizable core members; means mounting said core members in spaced apart superposed relationship; a plurality of windings and a like plurality of magnetizable pole members mounted alternately on each of said core members so as to provide said core members with superposed corresponding windings and pole members; non-magnetizable members containing the pole members on each of said core members in spaced relationship so that alternate volumes of equal axial length are provided on said core members and complementary relationship exists therebetween; a plurality of linear guide members in superposed relationship positioned between said core members; a magnetizable armature including rotatable members engaging said linear guide members to position said armature between said core members and to provide linear movement thereof in a parallel direction with respect to the longitudinal axis of said core members and maintain said armature in spaced relationship with respect to said core members.

2. The apparatus of claim 1 in which the non-magnetizable members consist of a plurality of current conductive laminations and each of said laminations contains a plurality of equally spaced receptacles in engagement with a like plurality of pole pieces.

3. The apparatus of claim 1 in which the pole pieces are in superposed complementary relationship.

4. The apparatus of claim 1 in which the longitudinal width of the magnetizable armature is equal to the longitudinal width of the pole pieces plus twice the distance between said armature and the surface of said pole pieces.

5. The apparatus of claim 1 in which one of said guide members and one of said engaging members on said armature are of complementary shape to prevent lateral motion of said armature with respect to said core members.

6. In a linear electric positioner wherein an armature is positioned in accordance with the energization of a plurality of coil windings utilized to magnetize a plurality of pole members the improvement comprising a retaining means for accurately positioning and holding a plurality of pole members in equally spaced relationship along the longitudinal axis of a magnetizable core member, said retaining means being of non-magnetizable current conducting material and having a plurality of laminations each having a plurality of equally spaced receptacles into which said pole pieces are inserted and securely retained.

7. In a linear electric positioner, the combination comprising; a pair of field members each having a plurality of coil windings and pole members alternately positioned axially thereof, said coil windings and said pole members being of equal dimension along said axis; means mounting said field members in superposed relationship; a plurality of guide means also mounted on said last named means in spaced apart parallel relationship therebetween with respect to said field members; an armature including a plurality of rotatable members for engagement with each of said guide members, at least a pair of which is shaped to coact with one of said guide members so as to prevent lateral movement with respect thereto, said armature also having a magnetizable member including first and second pole faces and positioned equidistantly between said field members for linear movement therebetween, each of said pole faces being of a width equal to the length of one pole member, taken along the longitudinal axis of said field member, plus twice the distance between each of said pole faces and said field members.

8. A linear positioner comprising; a pair of field members including a plurality of windings and magnetizable pole members of equal width mounted laterally thereof, said windings each having a pair of terminals, means connecting said coil windings in series relationship; mounting means for holding said field members in parallel superposed relationship whereby the pole members of one of said field members are positioned in alternate axial relationship with respect to the pole members on the other of said field members; a magnetizable armature reciprocably slidably mounted between said field members; means interconnecting the coil windings at opposite ends of one of said field members to the coil windings at opposite ends of the other of said field members; a source of electrical energy having a pair of output terminals; and selectively operable connecting means for energizing said coil windings including means for connecting one of said output terminals to a terminal on one of the windings on one of said field members and means connecting the other of said output terminals to both terminals on a winding in corresponding axial position on the other of said field members.

9. In a linear positioning motor of the type having a first and second plurality of coil windings each of which defines a plane, the planes defined by said first plurality of coil windings being parallel and spaced from one another, the planes defined by said second plurality of coil windings being parallel and spaced from one another, said first and second plurality of coil windings being positioned opposite one another to provide a space therebetween within which an armature is movably supported to be positioned by the selective application of electrical energy to said coil windings, the improvement comprising a first plurality of pole pieces, a separate pole piece of said first plurality being inserted between each of the coils in said first plurality of coil windings, a second plurality of pole pieces, a separate pole piece of said second plurality being inserted between each of the coils in said second plurality of coil windings, and means for positioning said first and second pluralities of coil windings opposite one another to stagger the locations of the pole pieces in said first plurality relative to the positions of the pole pieces in said second plurality.

References Cited in the file of this patent

UNITED STATES PATENTS

| | | |
|---|---|---|
| 1,929,990 | Rose | Oct. 10, 1933 |
| 2,337,430 | Trombetta | Dec. 21, 1943 |
| 2,911,538 | Munz | Nov. 3, 1959 |
| 2,931,963 | Wilson | Apr. 5, 1960 |
| 3,084,337 | Willard | Apr. 2, 1963 |